(12) United States Patent
Kim et al.

(10) Patent No.: US 8,975,867 B2
(45) Date of Patent: Mar. 10, 2015

(54) SECONDARY BATTERY PACK OF NOVEL STRUCTURE

(75) Inventors: Heegyu Kim, Seoul (KR); Seogjin Yoon, Chungcheongbuk-do (KR); Jung-Hwan Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 843 days.

(21) Appl. No.: 13/123,250

(22) PCT Filed: Oct. 13, 2009

(86) PCT No.: PCT/KR2009/005872
§ 371 (c)(1),
(2), (4) Date: Jul. 28, 2011

(87) PCT Pub. No.: WO2010/044589
PCT Pub. Date: Apr. 22, 2010

(65) Prior Publication Data
US 2011/0273807 A1    Nov. 10, 2011

(30) Foreign Application Priority Data

Oct. 14, 2008  (KR) .......................... 10-2008-0100621

(51) Int. Cl.
*H02J 7/00*    (2006.01)
*H02J 7/14*    (2006.01)
(Continued)

(52) U.S. Cl.
CPC ............ *H01M 10/425* (2013.01); *H01M 2/021* (2013.01); *H01M 2/0207* (2013.01); *H01M 2/30* (2013.01); *H01M 10/052* (2013.01); *H01M 2200/106* (2013.01)
USPC ........... 320/112; 320/114; 429/162; 429/163; 429/175; 429/176; 429/170

(58) Field of Classification Search
USPC .............. 320/112, 114; 429/7, 149, 176, 151, 429/150, 154, 162, 163, 177, 61, 175, 133, 429/170, 181, 182
See application file for complete search history.

(56) References Cited

U.S. PATENT DOCUMENTS

2003/0003357 A1    1/2003    Tamai et al.
2003/0170530 A1*   9/2003    Nishimura et al. ............. 429/61
(Continued)

FOREIGN PATENT DOCUMENTS

JP    2006-147193 A    6/2006
KR    10-2007-0101566 A    10/2007
(Continued)

OTHER PUBLICATIONS

International Search Report dated Apr. 27, 2010 in International Application No. PCT/KR2009/005872.

*Primary Examiner* — Edward Tso
*Assistant Examiner* — Alexis A Boateng
(74) *Attorney, Agent, or Firm* — Birch, Stewart, Kolasch & Birch, LLP

(57) ABSTRACT

Disclosed herein is a secondary battery pack including a battery cell having a pair of coupling grooves, each of the coupling grooves having a predetermined depth, an insulative mounting member mounted to the top of the battery cell, a protection circuit module (PCM) having a pair of connection coupling members protruding downward, and an insulative cap coupled to the top of the battery cell, wherein the connection coupling members are inserted into coupling grooves formed at electrode terminals of the battery cell through openings of the insulative mounting member in a state in which the insulative mounting member is mounted to the top of the battery cell, thereby achieving the coupling of the PCM to the battery cell and the insulative mounting member and the electrical connection between the battery cell and the PCM.

12 Claims, 8 Drawing Sheets

(51) Int. Cl.
*H01M 10/42* (2006.01)
*H01M 2/02* (2006.01)
*H01M 2/30* (2006.01)
*H01M 10/052* (2010.01)

(56) References Cited

U.S. PATENT DOCUMENTS

| | | | |
|---|---|---|---|
| 2003/0173709 A1* | 9/2003 | Iwaizono et al. | 264/272.17 |
| 2003/0180582 A1* | 9/2003 | Masumoto et al. | 429/7 |
| 2004/0126656 A1* | 7/2004 | Cho | 429/181 |
| 2004/0241541 A1* | 12/2004 | Watanabe et al. | 429/163 |
| 2004/0251872 A1* | 12/2004 | Wang et al. | 320/112 |
| 2005/0175889 A1* | 8/2005 | Han | 429/61 |
| 2005/0208345 A1* | 9/2005 | Yoon et al. | 429/7 |
| 2007/0160878 A1 | 7/2007 | Kim et al. | |
| 2008/0176134 A1 | 7/2008 | Kim | |

FOREIGN PATENT DOCUMENTS

| | | |
|---|---|---|
| KR | 10-2008-0034723 A | 4/2008 |
| KR | 10-0875430 B1 | 12/2008 |
| KR | 10-0930473 B1 | 12/2009 |
| KR | 10-2010-0041439 A | 4/2010 |
| WO | WO 2007/046579 A1 | 4/2007 |
| WO | WO 2008/050956 A1 | 5/2008 |

* cited by examiner

100

SECONDARY BATTERY PACK OF NOVEL STRUCTURE

TECHNICAL FIELD

The present invention relates to a secondary battery pack of a novel structure, and, more particularly, to a secondary battery pack including a battery cell, an insulative mounting member, a protection circuit module (PCM) having a pair of connection coupling members protruding downward, and an insulative cap coupled to the top of the battery cell, wherein the connection coupling members are inserted into coupling grooves formed at electrode terminals of the battery cell through openings of the insulative mounting member in a state in which the insulative mounting member is mounted to the top of the battery cell, thereby achieving the coupling of the PCM to the battery cell and the insulative mounting member and the electrical connection between the battery cell and the PCM.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

However, various combustible materials are contained in the lithium secondary battery. As a result, there is a possibility of danger in that the lithium secondary battery will be heated or explode due to overcharge, overcurrent or any other external physical impacts. In other words, the lithium secondary battery has low safety. Consequently, safety elements, such as a positive temperature coefficient (PTC) element and a protection circuit module (PCM), to effectively control an abnormal state of the lithium secondary battery, such as overcharge or overcurrent, are mounted in the lithium secondary battery in a state in which the safety elements are connected to a battery cell of the lithium secondary battery.

Generally, the PCM is connected to the battery cell via conductive nickel plates by welding or soldering. That is, nickel plates are connected to electrode tabs of the PCM by welding or soldering, and then the nickel plates are connected to electrode terminals of the battery cell by welding or soldering. In this way, the PCM is connected to the battery cell, thereby manufacturing a battery pack.

It is necessary for safety elements, including such a PCM, to be maintained in electrical connection with electrode terminals of a battery cell and, at the same time, to be electrically isolated from other parts of the battery cell. A plurality of insulative mounting members or a plurality of parts is necessary to achieve such connection with the result that a process for assembling a battery pack is complicated, and the size of a space to receive the battery cell is reduced.

Also, a plurality of welding or soldering processes is required to constitute a battery pack. Such welding processes must be carried out with high precision because the structure of the secondary battery is very small with the result that a defect ratio may be increased. Furthermore, such processes are added to manufacture a product with the result that manufacturing cost of the product is increased.

For this reason, research has been actively conducted on technology to reduce the number of parts to be mounted to the top of the battery cell and simplify the assembly process of the battery cell, thereby improving manufacturing efficiency of the battery cell. For example, Korean Patent Application Publication No. 2007-01566 discloses a lithium secondary battery including a protection circuit unit having a protection circuit, the protection circuit unit including a cathode terminal and an anode terminal, a bare cell including an electrode assembly, a container in which the electrode assembly is mounted, and a cap assembly to seal the container, the cap assembly having a cap plate formed at one side thereof, the cap plate being provided with an electrolyte injection port, and a cathode lead plate and an anode lead plate to electrically connect the bare cell and the protection circuit unit to each other, wherein a protruding part is formed at the cathode lead plate, and the protruding part of the cathode lead plate is inserted into the electrolyte injection port during manufacturing of the battery so as to prevent the protection circuit unit from being separated from the bare cell.

In the above technology, however, it is complicate to manufacture the cathode lead plate configured in a specific structure having the protruding part. Also, the protruding part serves to seal the electrolyte injection port. However, it is not possible to prevent leakage of an electrolyte through only the forcible insertion of the protruding part. The electrolyte injection port may be sealed by welding the protruding part to the electrolyte injection port so as to prevent the leakage of the electrolyte. In this method, however, such an additional process is required, and therefore, manufacturing efficiency is lowered.

Consequently, there is a high necessity for technology to reduce the number of members mounted to the top of the battery cell, thereby simplifying an assembly process, to eliminate a welding process, thereby minimizing a defect ratio during the assembly of battery cells, and to achieve stable coupling between members disposed at the top of the battery cell.

DISCLOSURE

Technical Problem

Therefore, the present invention has been made to solve the above problems, and other technical problems that have yet to be resolved.

Specifically, it is an object of the present invention to provide a secondary battery pack wherein the number of members necessary to manufacture the battery pack is reduced, thereby simplifying an assembly process and thus reducing manufacturing cost of the battery pack, a soldering or welding process is eliminated, thereby improving manufacturing efficiency and minimizing a defect ratio.

It is another object of the present invention to provide a protection circuit module (PCM) in which connection coupling members are coupled in a specific structure, thereby manufacturing a secondary battery pack as described above.

Technical Solution

In accordance with one aspect of the present invention, the above and other objects can be accomplished by the provision of a secondary battery pack including a battery cell having an electrode assembly of a cathode/separator/anode structure mounted in a battery case together with an electrolyte in a sealed state, the battery cell being provided at the top thereof with a pair of coupling grooves, into which connection coupling members are inserted, each of the coupling grooves having a predetermined depth, an insulative mounting member having openings, through which electrode terminals of the battery cell are exposed to the outside, the insulative mounting member being configured to have a structure in which a protection circuit module is disposed at the top of the insulative mounting member, the insulative mounting member being mounted to the top of the battery cell, a protection circuit module (PCM) having a protection circuit to control overcharge, overdischarge and overcurrent of the battery cell, the PCM being provided with a pair of connection coupling members for mechanical coupling and electrical connection with the battery cell, the connection coupling members protruding downward, the PCM being disposed on the insulative mounting member, and an insulative cap coupled to the top of the battery cell so that the insulative cap surrounds the insulative mounting member in a state in which the PCM is disposed on the insulative mounting member, wherein the connection coupling members are inserted into the coupling grooves formed at the electrode terminals of the battery cell through the openings of the insulative mounting member in a state in which the insulative mounting member is mounted to the top of the battery cell, thereby achieving the coupling of the PCM to the battery cell and the insulative mounting member and the electrical connection between the battery cell and the PCM.

Generally, in a conventional battery pack, the PCM is a separate member. The PCM is mounted to the top of the battery cell in a state in which the PCM is electrically connected to the top of the battery cell. The PCM is connected to the cathode terminal and the anode terminal of the battery cell via nickel clad members or nickel plates. The connection between the PCM and the top of the battery cell is mainly achieved by welding or soldering with the result that a defect ratio is high and, in addition, a space in which the nickel plates are mounted is required.

In the secondary battery pack according to the present invention, on the other hand, the pair of connection coupling members mounted to the protection circuit module are inserted into the coupling grooves formed at the electrode terminals of the battery cell through the openings of the insulative mounting member, thereby achieving the coupling of the PCM to the battery cell and the insulative mounting member and the electrical connection between the battery cell and the PCM. Consequently, it is possible to perform a predetermined assembly process using a generally simple connection method, and therefore, it is possible to easily manufacture the secondary battery pack, thereby greatly improving manufacturing efficiency.

Also, it is possible to achieve the electrical connection between the PCM and the battery cell without using the nickel plates or the nickel clad members. Consequently, it is possible to reduce the number of parts necessary to manufacture the battery pack and to manufacture the battery pack through only an assembly process without soldering or welding.

It is required for the battery case to be easily manufactured and to exhibit a mechanical strength greater than a predetermined level. For this reason, the battery case may be a metal container, preferably an aluminum container or a stainless steel container.

The structure of each of the connection coupling members is not particularly restricted so long as the connection coupling members can be inserted into the coupling grooves formed at the electrode terminals of the battery cell in a state in which the connection coupling members are mounted to the protection circuit module, thereby easily achieving the connection therebetween. Preferably, each of the connection coupling members is configured to have a conductive connection pin or conductive screw structure.

In the above structure, the connection coupling members may be mounted to the PCM in a structure in which the connection coupling members extend through the PCM from above and are fixed in a state in which the connection coupling members are connected to the circuit of the PCM. For example, each of the connection coupling members may include a main body formed in the shape of a connection pin or screw and a head having a larger diameter than the main body. When the lower part of the main body is coupled into a corresponding one of the coupling grooves formed at the electrode terminals of the battery cell through the PCM, the head comes into tight contact with the top of the PCM, thereby preventing the PCM from being separated from the top of the battery cell.

The coupling of the connection coupling members into the coupling grooves of the electrode terminals may be achieved in various manners. Preferably, the coupling of the connection coupling members into the coupling grooves of the electrode terminals is achieved by forcible fitting or threaded coupling, thereby achieving more secure coupling between the connection coupling members and the coupling grooves of the electrode terminals.

For example, screw type connection coupling members may be inserted into coupling grooves having screw threads formed at the insides thereof, thereby easily achieving the electrical connection and mechanical coupling between the connection coupling members and the coupling grooves. Also, screw threads may be formed at the coupling grooves when the screw type connection coupling members are inserted into the coupling grooves. Even in this case, the coupling between the connection coupling members and the coupling grooves is also achieved.

Meanwhile, the PCM may be provided at the protection circuit formed at the bottom thereof with a positive temperature coefficient (PTC) element configured so that resistance of the PTC element increases with the increase of temperature. The PTC element may be disposed at the protection circuit of the PCM in various structures. For example, the PTC element may be interposed between a pair of conductive members, and then the conductive members may be connected to the protection circuit of the PCM. Alternatively, the PTC element may be manufactured in the form of a chip and then mounted to the protection circuit of the PCM using surface mount technology (SMT).

For information, the SMT is widely used to mount surface mount type parts to an electronic board, such as a printed circuit board (PCB). The PTC element contains a material of which resistance changes based on temperature. When the interior temperature of the battery abruptly increases, therefore, the PTC element interrupts the supply of electric current, thereby improve safety of the battery.

As previously described, the coupling grooves may be formed at the top of the battery cell, i.e., a top cap, at which the cathode terminal and the anode terminal of the battery cell are formed. Each of the coupling grooves may have a depth of 0.3 to 3 mm. If the depth of each of the coupling grooves is too large, it is required for the thickness of the top cap to be increased. Furthermore, the connection coupling members may penetrate the top cap and come into contact with the interior of the battery cell. On the other hand, if the depth of each of the coupling grooves is too small, the connection coupling members may easily separated from the coupling grooves, which is not preferable.

Meanwhile, each of the coupling grooves formed at the electrode terminals may be formed in various shapes. For example, each of the coupling grooves formed at the electrode terminals may be formed in the shape of one selected from a group consisting of a planar circle, a planar oval and a planar slit. In this case, each of the connection coupling members is formed in a shape corresponding to a corresponding one of the coupling grooves so that the connection coupling members can be inserted and fixed in the respective coupling grooves.

As previously described, the insulative mounting member is configured in a structure in which the PCM is disposed at the top of the insulative mounting member. The insulative mounting member is made of an insulative material disposed in direct tight contact with the top of the battery cell. As an example, the insulative mounting member may have a size approximately equivalent to that of the top of the battery cell and may be provided at the middle thereof with a first opening, through which a first electrode terminal of the battery cell is exposed, and a second opening, through which a portion (a second electrode terminal) of the top of the battery case of the battery cell is exposed, the second opening being spaced a predetermined distance from the first opening.

Consequently, the connection coupling members of the PCM can be easily inserted into the coupling grooves of the first electrode terminal and the second electrode terminals of the battery cell through the first opening and the second opening of the insulative mounting member.

Meanwhile, the first electrode terminal may be a cathode terminal, and the second electrode terminal may be an anode terminal.

For example, a prismatic battery cell may be configured in a structure in which an electrode terminal protruding from the top of the battery cell and a battery case form an anode terminal and a cathode terminal, respectively, and an insulative member is interposed therebetween, thereby achieving insulation from each other. In such a prismatic battery cell, therefore, the first electrode terminal may be the top of the battery case, i.e. the cathode terminal, and the second electrode terminal may be the anode terminal protruding from the top of the battery case.

As another example, the top of the insulative mounting member may be formed in a shape corresponding to the PCM so that the PCM is mounted on the top of the insulative mounting member and fixed to top of the insulative mounting member in position, and the insulative mounting member may be provided at opposite outermost protruding ends thereof with protruding parts configured to be coupled to the insulative cap.

The above structure of the insulative mounting member improves the tight contact between the insulative mounting member and the PCM. In a case in which the PCM is mounted to the top of the insulative mounting member, it is possible to easily prevent the PCM from deviating from its position in the lateral direction due to external impact, such as vibration and dropping.

In this case, the PCM may be provided at opposite ends thereof with grooves depressed inward so as to have a predetermined width, and the insulative mounting member may be provided at the tops of the protruding parts thereof with coupling protrusions protruding inward so as to correspond to grooves. In the above coupling structure, therefore, the coupling between the insulative mounting member and the PCM is further improved during assembly of the battery.

The insulative cap serves to protect the battery cell against external impact, to increase mechanical strength of members mounted to the top of the battery cell and to maintain the electrical insulation of the battery cell. Preferably, in order to improve coupling of the insulative cap to the battery cell, the insulative cap extends downward by a predetermined length sufficient for at least a portion of the insulative cap to surround the outside of the top of the battery cell in a state in which the insulative cap is mounted to the battery cell. Preferably, the downward extending portion of the insulative cap is coupled to the outside of the top of the battery cell by bonding or mechanical coupling so as to maximize the above effect.

The secondary battery pack may further include another insulative cap (bottom cap) coupled to the bottom of the battery cell in addition to the insulative cap coupled to the top of the battery cell. Also, the secondary battery pack may further include a sheathing film attached to the outside of the battery case of the battery cell. As a result, it is possible to protect the battery cell against external impact and to maintain the electrical insulation of the battery pack. Preferably, the sheathing film is attached to the outside of the battery case of the battery cell so that the sheathing film surrounds the downward extending portion of the insulative cap.

In the secondary battery pack according to the present invention, any battery cells may be used in various manners irrespective of the kind and shape of the battery cells. A prismatic lithium secondary battery cell is preferably used.

In accordance with another aspect of the present invention, there is provided a protection circuit module (PCM) mounted to a secondary battery cell, wherein the PCM includes a PCM main body having a protection circuit to control overcharge, overdischarge and overcurrent of the battery cell and a pair of connection coupling members for mechanical coupling and electrical connection with the battery cell, the connection coupling members being configured in a conductive pin or screw structure in which the connection coupling members extend through the PCM main body from above and are fixed in a state in which the connection coupling members protrude downward at positions corresponding to electrode terminals of the battery cell.

In the protection circuit module according to the present invention, therefore, it is possible to simply and easily achieve the electrical connection and mechanical coupling between the protection circuit module and the electrode terminals of the battery cell using the connection coupling members without soldering or welding as compared with a conventional battery cell connecting structure in which a protection circuit module is electrically connected to electrode terminals of a battery cell by soldering or welding.

Also, the protection circuit module including the connection coupling members do not require nickel plates or nickel clad members, thereby greatly reducing the number of components of the protection circuit module.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
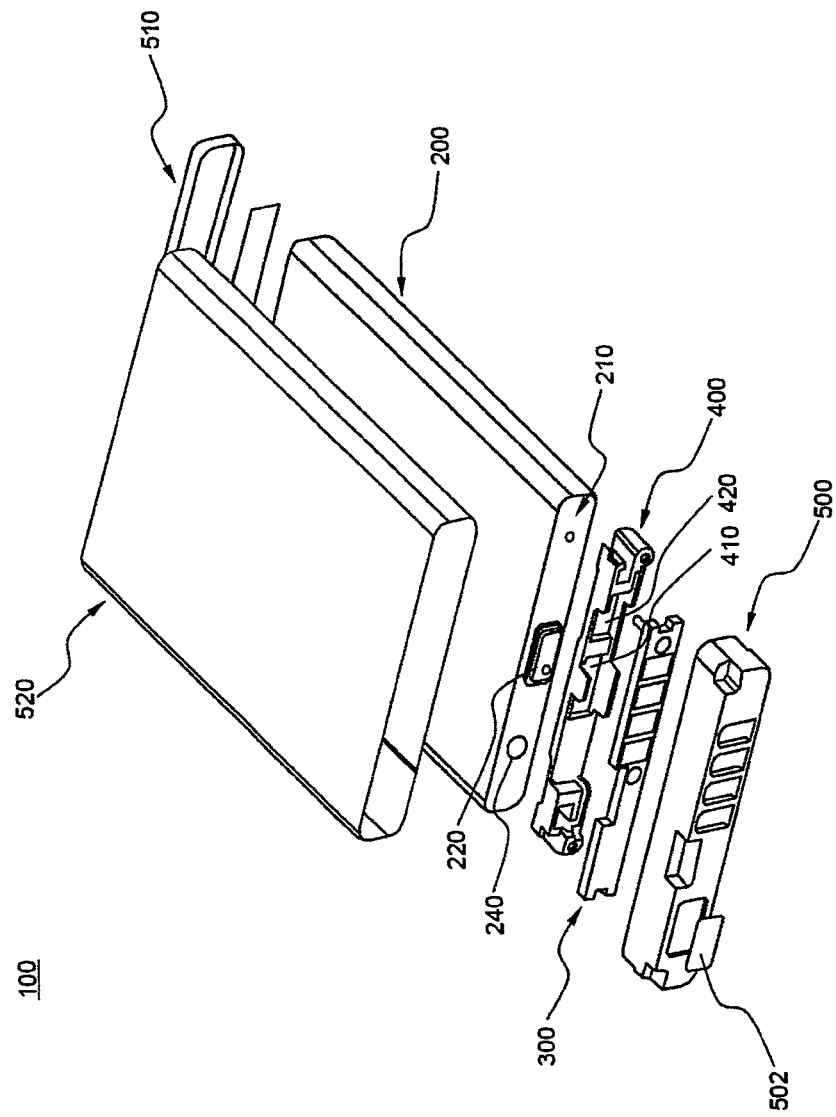
FIG. 1 is an exploded perspective view illustrating a secondary battery pack according to an embodiment of the present invention.

FIG. 1 is an exploded perspective view typically illustrating a secondary battery pack according to an embodiment of the present invention.

Referring to FIG. 1, a secondary battery pack 100 includes a battery cell 200 having an electrode assembly mounted in a battery case together with an electrolyte in a sealed state, a protection circuit module (PCM) 300 to effectively control an abnormal state, such as overcharge, of the battery cell 200, an insulative mounting member 400 mounted to the top 210 of the battery cell 200 in a state in which the PCM 300 is disposed on the insulative mounting member 400, an insulative top cap 500 coupled to the top of the battery cell 200 so that the insulative top cap 500 surrounds the insulative mounting member 400 in a state in which the PCM 300 is disposed on the insulative mounting member 400, an insulative bottom cap 510 coupled to the bottom of the battery cell 200, and a sheathing film 520 attached to the battery case of the battery cell 200 to surround the outside of the battery case.

A first electrode terminal 220, protruding upward in a state in which the first electrode terminal 220 is insulated from the battery case, is formed at the top 210 of the battery cell 200. The remaining portion of the top 210 of the battery cell 200, excluding the first electrode terminal 220, forms a cathode terminal. Also, an electrolyte injection port 240, sealed by a metal ball or a polymer resin, protrudes in a planar circular shape.

The insulative mounting member 400 is coupled to the top 210 of the battery cell 200 by bonding. A first opening 410 is formed at the middle region of the insulative mounting member 400 so that the protruding first electrode terminal 220 of the battery cell 200 is exposed upward through the first opening 410. A second opening 420 is formed at the right region of the insulative mounting member 400 so that a portion of the top of the battery cell 200 is exposed through the second opening 420.

The insulative top cap 500 is coupled to the top of the battery cell 200 so that the insulative top cap 500 surrounds the insulative mounting member 400 in a state in which the PCM 300 is disposed on the insulative mounting member 400. The insulative top cap 500 extends downward a predetermined length so as to surround the outside of the top of the battery cell 200. A warranty label 502 is attached to one side of the top of the insulative top cap 500.

The sheathing film 520 is attached to the outside of the battery case to maintain electrical insulation of the battery cell 200 from the outside and to display product information. The sheathing film 520, made of a thermally shrinkable material, is formed in the shape of a tube. The sheathing film 520 is disposed so as to surround the battery cell 200, and then heat is applied to the sheathing film 520 so that the sheathing film 520 shrinks and comes into tight contact with the outside of the battery case of the battery cell 200.

Figure 2:
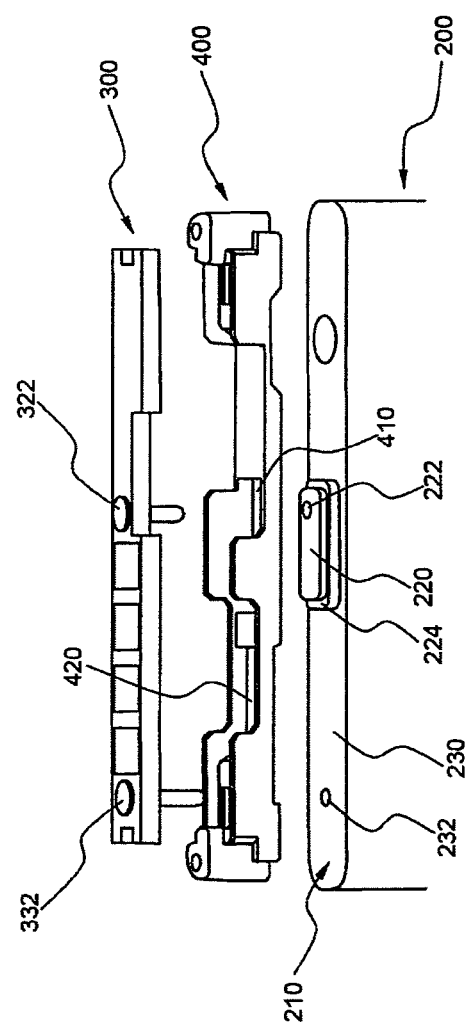
FIG. 2 is an exploded typical view illustrating the coupling of a protection circuit module (PCM) assembly, an insulative mounting member and a battery cell.

FIG. 2 is an exploded typical view illustrating the coupling of the PCM assembly, the insulative mounting member and the battery cell.

Referring to FIG. 2, the top 210 of the battery cell 200 is used as a second electrode terminal 230. The first electrode terminal 220 is formed at the middle region of the top of the battery cell 200 so that the first electrode terminal 220 is insulated from the second electrode terminal 230 by an insulative member 224. Coupling grooves 222 and 232 are formed at one side of the top 210 of the battery cell 200 and at the first electrode terminal 220, respectively. The insulative mounting member 400 has a size approximately equivalent to that of the top 210 of the battery cell 200. The insulative mounting member 400 is provided at the middle thereof with the first opening 410, through which the first electrode terminal 220 of the battery cell 200 is exposed, and the second opening 420, through which the electrode terminal coupling groove 232 of the top 210 of the battery cell 200 is exposed.

Connection coupling members 322 and 332 are mounted to positions of the PCM 300 corresponding to the coupling grooves 222 and 232 formed at the electrode terminals of the battery cell 200. Each of the connection coupling members 322 and 332 may be configured to have a conductive pin or screw structure. The connection coupling members 322 and 332 are mounted to the PCM 30 in a structure in which the connection coupling members 322 and 332 extend through the PCM 300 from above and are fixed in a state in which the connection coupling members 322 and 332 are connected to a circuit (not shown) of the PCM 300. During assembly of a battery, the lower parts of the connection coupling members 322 and 332 are inserted into the coupling grooves 222 and 232 formed at the electrode terminals of the battery cell 200, respectively, thereby achieving electrical connection and mechanical coupling between the electrode terminals 220 and 230 of the battery cell 200 and the PCM 300.

Also, each of the coupling grooves 222 and 232, having a predetermined depth, are formed in a planar circular shape corresponding to the bottom of a corresponding one of the connection coupling members 322 and 332.

Figure 3:
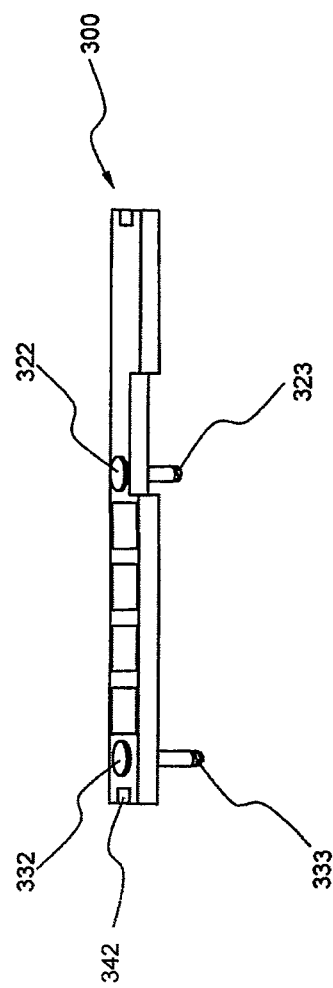
FIG. 3 is a typical view of the PCM assembly.
Figure 4:
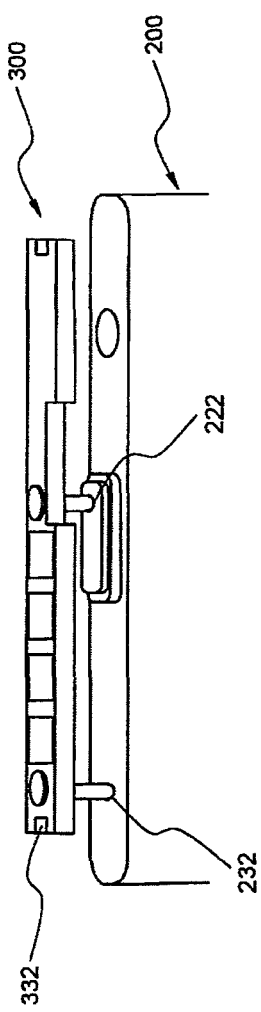
FIG. 4 is a typical view illustrating the structure in which the PCM assembly is mounted to the top of the battery cell.

FIG. 3 is a typical view of a PCM according to an embodiment of the present invention, and FIG. 4 is a typical view illustrating the structure in which the PCM is mounted to the top of the battery cell.

Referring to these drawings, the PCM 300 is provided at opposite ends thereof with slit type grooves 342 depressed inward so as to have a predetermined width. Screw threads are formed at lower parts 323 and 333 of the connection coupling members 322 and 332 mounted to the PCM 300. When the lower parts 323 and 333 of the connection coupling members 322 and 332 are inserted into the coupling grooves 222 and 232 formed at the electrode terminals of the battery cell 200, therefore, the connection coupling members 322 and 332 are threadedly engaged into the coupling grooves 222 and 232 formed at the electrode terminals of the battery cell 200 by the screw threads formed at lower parts 323 and 333 of the connection coupling members 322 and 332. According to circumstances, each of the connection coupling members 322 and 332 may be configured in a conductive pin structure so that the connection coupling members 322 and 332 can be inserted into the coupling grooves 222 and 232 of the electrode terminals by forcible fitting, thereby achieving the coupling between the connection coupling members 322 and 332 and the coupling grooves 222 and 232 of the electrode terminals.

Also, a positive temperature coefficient (PTC) element (not shown), configured so that resistance of the PTC element increases with the increase of temperature, is mounted to a protection circuit (not shown) formed at the bottom of the PCM 300 in the form of a chip using surface mount technology (SMT).

Figure 5:
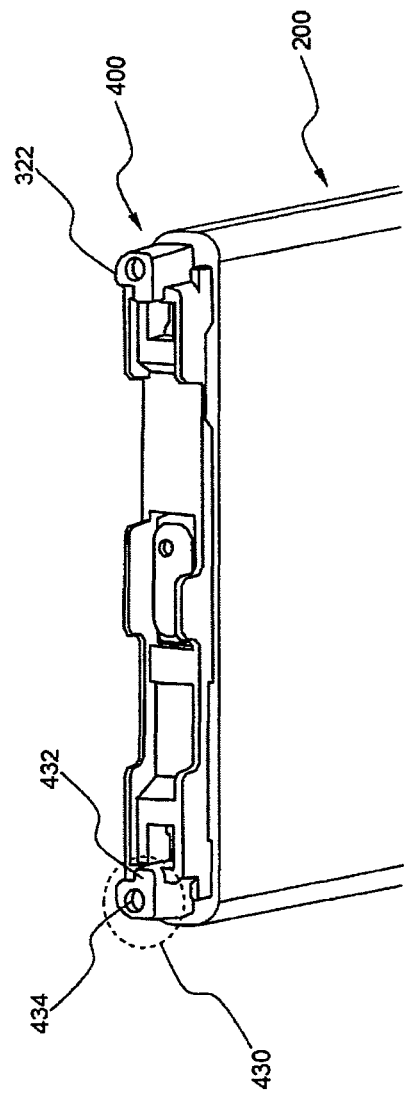
FIG. 5 is a typical view illustrating the structure in which the insulative mounting member is coupled to the top of the battery cell.
Figure 6:
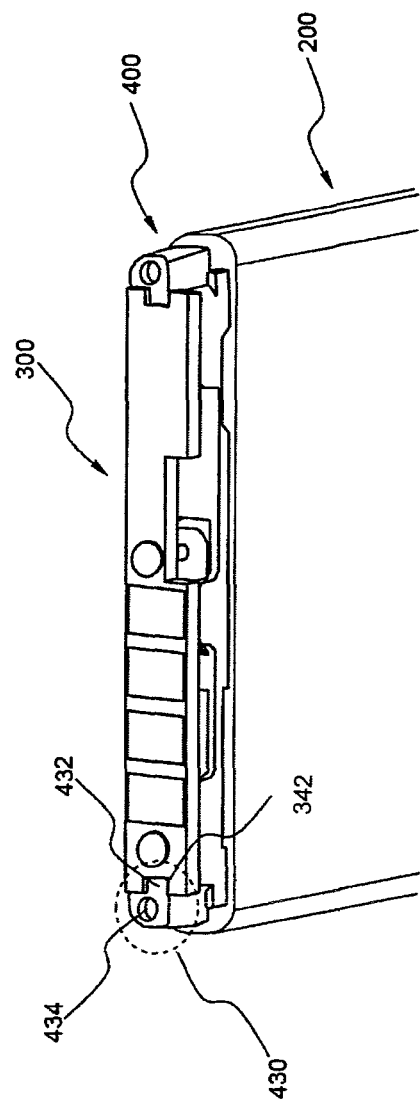
FIG. 6 is a typical view illustrating the structure in which the PCM assembly is mounted to the structure of FIG. 5.

FIG. 5 is a typical view illustrating the structure in which the insulative mounting member is coupled to the top of the battery cell, and FIG. 6 is a typical view illustrating the structure in which the PCM is mounted to the structure of FIG. 5.

Referring to these drawings, the top of the insulative mounting member 400 is formed in a shape corresponding to the PCM 300 so that the PCM 300 is mounted on the top of the insulative mounting member 400 and fixed to top of the insulative mounting member 400 in position. The insulative mounting member 400 is provided at opposite outermost protruding ends thereof with coupling parts 434 configured to be coupled to the insulative cap 500 (see FIG. 1). Also, coupling protrusions 432, protruding inward so as to correspond to grooves 332 grooves 342 formed at opposite ends of the PCM 300, are formed at the tops of the protruding parts 430. Consequently, the coupling protrusions 432 of the insulative mounting member 400 are coupled into the grooves 342 of the PCM 300, and therefore, the PCM 300 is more stably mounted to the insulative mounting member 400.

Figure 7:
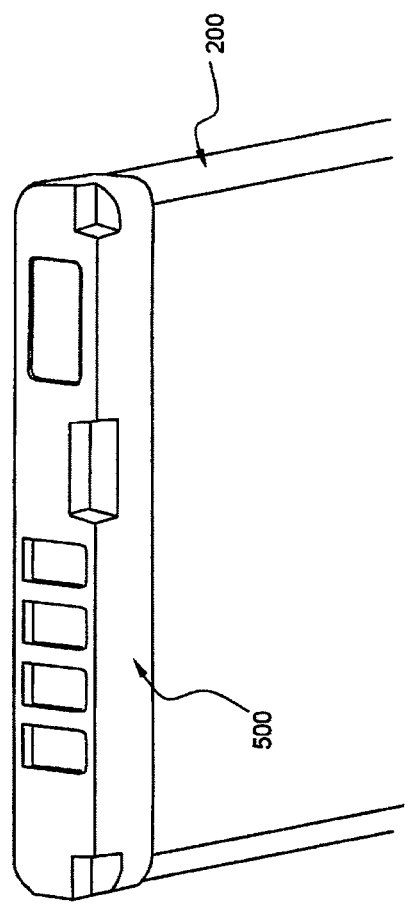
FIG. 7 is a typical view illustrating the structure in which an insulative top cap is coupled to the structure of FIG. 6.
Figure 8:
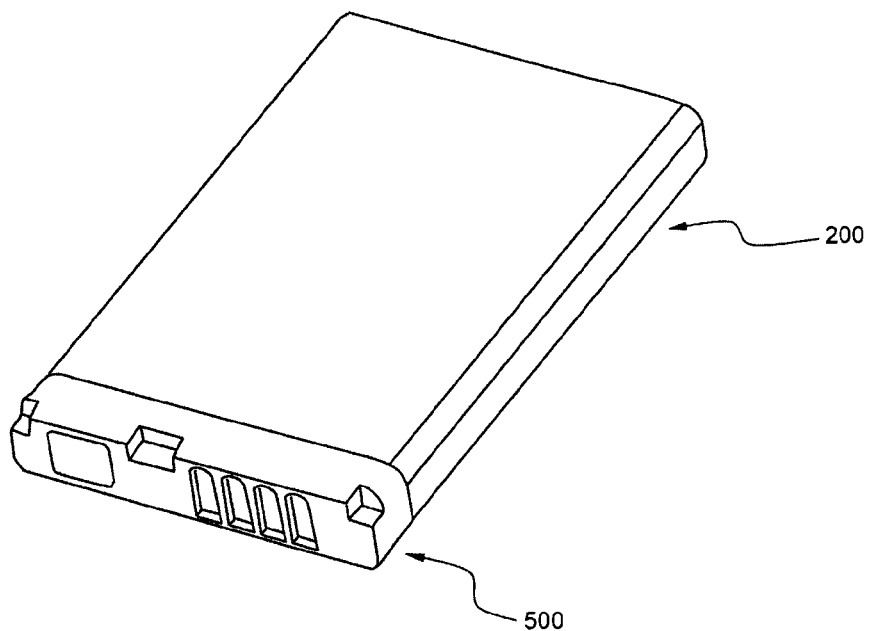
FIG. 8 is a perspective view illustrating a manufactured secondary battery pack.

FIG. 7 is a typical view illustrating the structure in which the insulative top cap is coupled to the structure of FIG. 6, and FIG. 8 is a perspective view typically illustrating a manufactured secondary battery pack.

Referring to these drawings, the insulative top cap 500 extends downward a predetermined length so that at least a portion of the insulative top cap 500 can surround the outside of the top of the battery cell 200. The insulative top cap 500 is coupled to the outside of the top of the battery cell 200 by bonding.

INDUSTRIAL APPLICABILITY

As is apparent from the above description, a secondary battery pack according to the present invention is configured to have a structure in which a pair of coupling members mounted to a protection circuit module extend through openings of an insulative mounting member and are directly inserted into coupling grooves formed at electrode terminals of a battery cell. Consequently, it is possible to simply and easily achieve the electrical connection and mechanical coupling between the protection circuit module and the battery cell and to greatly reduce the number of components as compared with a conventional battery cell structure using a nickel clad member and a nickel plate.

Also, a soldering or welding process is not required during manufacturing of a battery, thereby improving manufacturing efficiency and minimizing a defect ratio.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
a battery cell having an electrode assembly of a cathode/separator/anode structure mounted in a battery case together with an electrolyte in a sealed state, the battery cell being provided at the top thereof with a pair of coupling grooves, into which connection coupling members are inserted, each of the coupling grooves having a predetermined depth;
an insulative mounting member having openings, through which electrode terminals of the battery cell are exposed to the outside, the insulative mounting member being configured to have a structure in which a protection circuit module is disposed at the top of the insulative mounting member, the insulative mounting member being mounted to the top of the battery cell;
a protection circuit module (PCM) having a protection circuit to control overcharge, overdischarge and overcurrent of the battery cell, the PCM being provided with a pair of connection coupling members for mechanical coupling and electrical connection with the battery cell, the connection coupling members protruding downward, the PCM being disposed on the insulative mounting member; and
an insulative cap coupled to the top of the battery cell so that the insulative cap surrounds the insulative mounting member in a state in which the PCM is disposed on the insulative mounting member,
wherein the connection coupling members are inserted into the coupling grooves formed at the electrode terminals of the battery cell through the openings of the insulative mounting member in a state in which the insulative mounting member is mounted to the top of the battery cell, thereby achieving the coupling of the PCM to the battery cell and the insulative mounting member and the electrical connection between the battery cell and the PCM,
wherein the top of the insulative mounting member is formed in a shape corresponding to the PCM so that the PCM is mounted on the top of the insulative mounting member and fixed to top of the insulative mounting member in position,
wherein the insulative mounting member is provided at opposite outermost protruding ends thereof with protruding parts,
wherein the PCM is provided at opposite ends thereof with grooves depressed inward so as to have a predetermined width,
wherein the protruding parts are provided with coupling protrusions protruding inward so as to correspond to the grooves, and
wherein the protruding parts further comprise coupling parts to couple the protruding parts to the insulative cap.

2. The secondary battery pack according to claim 1, wherein the battery case is a metal container.

3. The secondary battery pack according to claim 1, wherein each of the connection coupling members is configured to have a conductive connection pin or conductive screw structure.

4. The secondary battery pack according to claim 3, wherein the connection coupling members are mounted to the PCM in a structure in which the connection coupling members extend through the PCM from above and fixed in a state in which the connection coupling members are connected to the circuit of the PCM.

5. The secondary battery pack according to claim 1, wherein the coupling of the connection coupling members into the coupling grooves of the electrode terminals is achieved by forcible fitting or threaded coupling.

6. The secondary battery pack according to claim 1, wherein the PCM is provided at the protection circuit formed at the bottom thereof with a positive temperature coefficient (PTC) element configured so that resistance of the PTC element increases with the increase of temperature.

7. The secondary battery pack according to claim 1, wherein the coupling grooves are formed at a top cap of the battery cell to a depth of 0.3 to 3 mm.

8. The secondary battery pack according to claim 1, wherein the insulative mounting member has a size approximately equivalent to that of the top of the battery cell and is provided at the middle thereof with a first opening, through which a first electrode terminal of the battery cell is exposed, and a second opening, through which a portion (a second electrode terminal) of the top of the battery case of the battery cell is exposed, the second opening being spaced a predetermined distance from the first opening.

9. The secondary battery pack according to claim 1, further comprising another insulative cap (bottom cap) coupled to the bottom of the battery cell.

10. The secondary battery pack according to claim 1, further comprising a sheathing film attached to the outside of the battery case of the battery cell.

11. The secondary battery pack according to claim 1, wherein the battery cell is a prismatic lithium secondary battery cell.

12. The secondary battery pack according to claim 1, wherein the coupling parts are provided on a top surface of the protruding parts.

* * * * *